No. 817,053. PATENTED APR. 3, 1906.
W. ELLINGEN & F. DOEHLE.
CABLE GRIP FOR CABLE HAULED TRUCKS AND THE LIKE.
APPLICATION FILED JAN. 25, 1904.

3 SHEETS—SHEET 1.

No. 817,053. PATENTED APR. 3, 1906.
W. ELLINGEN & F. DOEHLE.
CABLE GRIP FOR CABLE HAULED TRUCKS AND THE LIKE.
APPLICATION FILED JAN. 25, 1904.
3 SHEETS—SHEET 2.
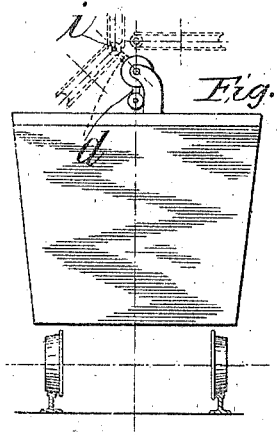
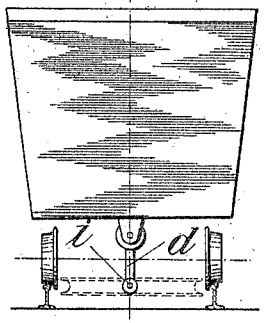
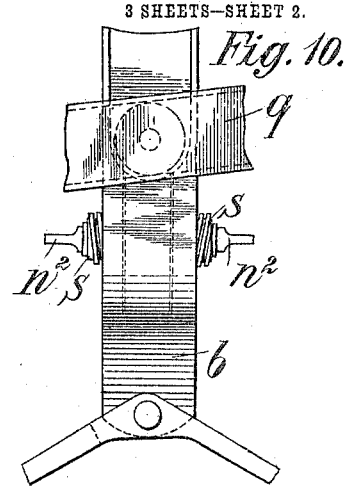
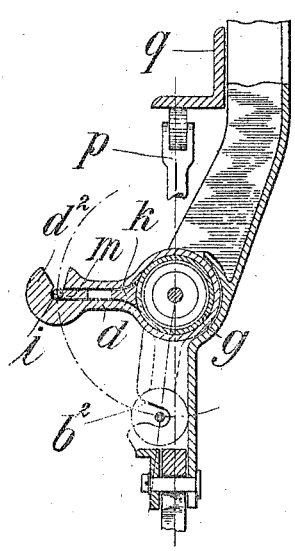
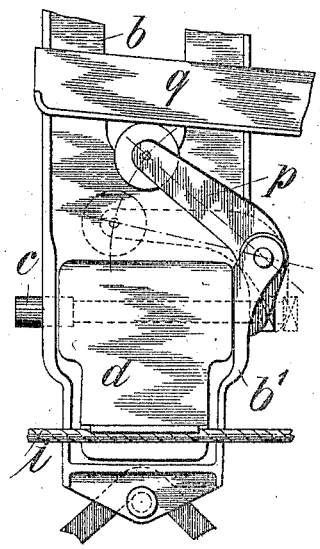
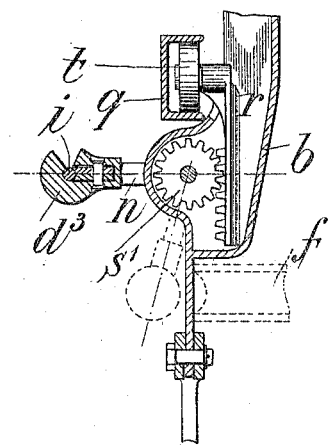
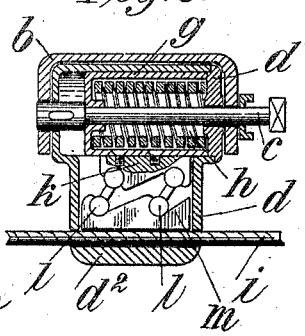
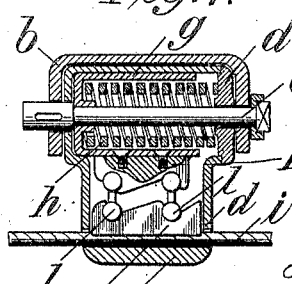
Witnesses:
O. W. Sommers
M. E. Beall
Inventors:
Wilhelm Ellingen
Fritz Doehle
by Henry Orth, Attys No. 817,053. PATENTED APR. 3, 1906.
W. ELLINGEN & F. DOEHLE.
CABLE GRIP FOR CABLE HAULED TRUCKS AND THE LIKE.
APPLICATION FILED JAN. 25, 1904.
3 SHEETS—SHEET 3.
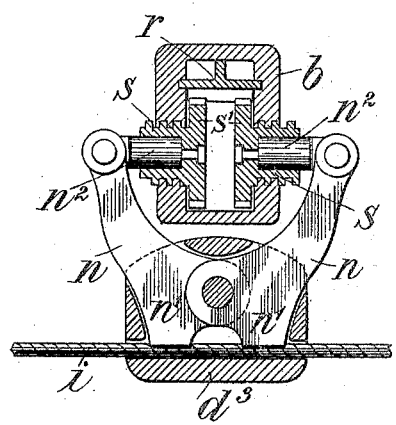
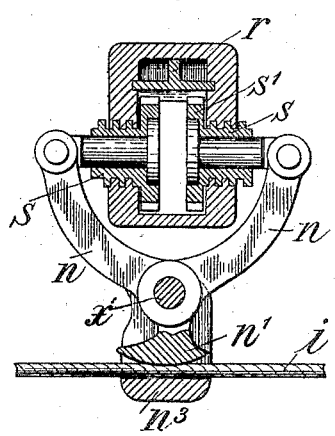
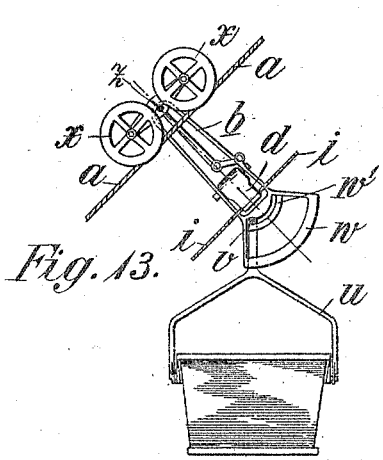
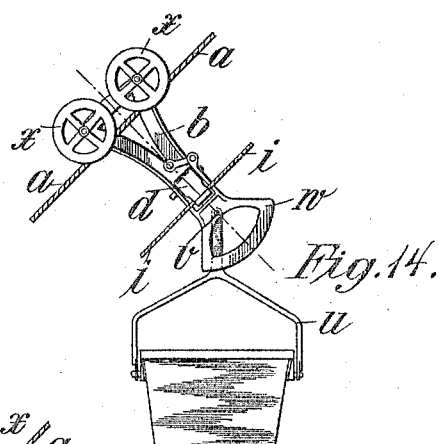
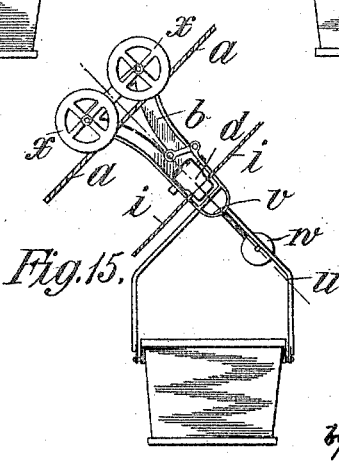

UNITED STATES PATENT OFFICE.

WILHELM ELLINGEN, OF COLOGNE, GERMANY, AND FRITZ DOEHLE, OF GENEVA, SWITZERLAND, ASSIGNORS TO J. POHLIG, AKTIEN-GESELLSCHAFT, OF COLOGNE-ZOLLSTOCK, GERMANY.

CABLE-GRIP FOR CABLE-HAULED TRUCKS AND THE LIKE.

No. 817,053.        Specification of Letters Patent.        Patented April 3, 1906.

Application filed January 25, 1904. Serial No. 190,497.

*To all whom it may concern:*

Be it known that we, WILHELM ELLINGEN, residing at Cologne-on-the-Rhine, Germany, and FRITZ DOEHLE, residing at Geneva, Switzerland, subjects of the King of Prussia, German Emperor, have invented certain new and useful Improvements Relating to Cable-Grips for Cable-Hauled Trucks and the Like; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to carriages or rope haulage, and more especially to the arrangement of a pivoted or movable grip that may be applied to carriages of ropeways or traction systems using fixed rails, said grip being so constructed as to easily pass the sheaves guiding the traction-rope without opening the gripping-jaws or throwing the rope out of the grooves in the sheaves, thereby allowing these sheaves to be placed at any angle and the carriages to pass around any desired curve, whether horizontal, inclined, or vertical.

The invention further relates to details of structure to be hereinafter described and claimed.

Figure 1:
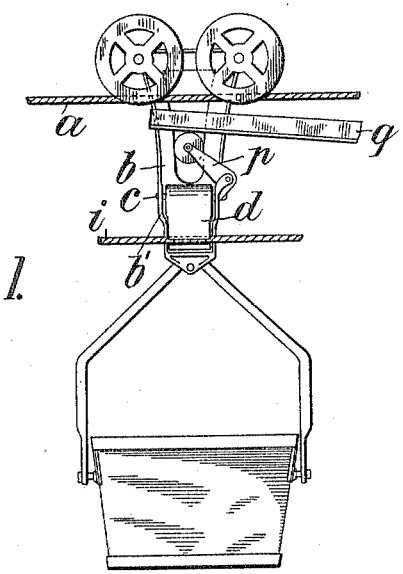
Figure 2:
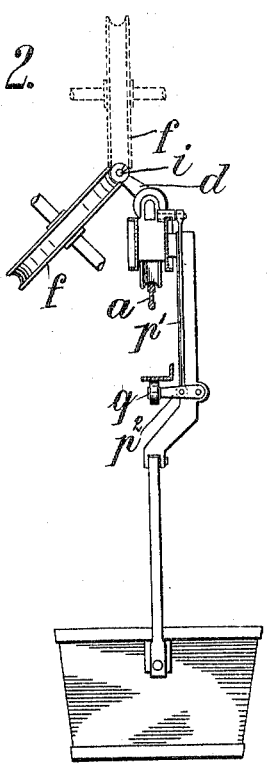

Referring to the drawings, in which like parts are similarly designated, Figure 1 is a front view of an overhead rope-carriage. Fig. 2 shows the manner in which the pivoted grip engages variously-positioned traction-rope sheaves, the last-mentioned figure also showing the grip carried at the top of the carriage. Figs. 3 and 4 show the grip applied to a car on a fixed track. Figs. 5, 6, 7, and 8 are views showing one form of structure of the grip. Figs. 9, 10, and 11 show a modification, Fig. 12 another modification, and Figs. 13, 14, and 15 show ropeway-carriages provided with counterweights.

Referring to Figs. 1, 2, $a$ is the carrier-rope of an overhead rope haulage system, $i$ the traction-rope by which the carriage $b$ is hauled along the way, and $f$ one of the guide-sheaves for the traction-rope $i$. The carriage $b$ has the pivoted arm $d$, revoluble about a horizontal axis or pivot-pin $c$, and its free end being constructed as a rope-grip. This grip comprises the pivoted arm against whose hook-shaped end $d^2$, Figs. 5, 7, are forced one or more jaws $m$ to clamp the traction-rope $i$ in the hook $d^2$. The movable jaw or jaws are actuated by suitable operating devices on the carriage $b$, which operate intermediate the axis of revolution of the jaws and hook or directly on this axis, so that these jaw-actuating devices are independent of any position of the hook end $d^2$. The hook is pivoted at $c$ between two legs $b'$, each provided with a recess $b^2$, registering with the hook, so that the rope will lie in the recesses when the arm $d$ is in its lowermost position. In Fig. 2 the arm-grip is shown traveling with the rope $i$ around a horizontal sheave $f$, the rim of the sheave thus acting as a track around which the carriage is guided, the legs $b'$ being so shaped as to prevent the said rope $i$ from being thrown off the sheave when the grip is in its lowermost position.

Referring more particularly to Figs. 5, 8, for one structure of grip it will be seen that the legs $b'$ of the carriage $b$ have a slidable pivot-pin $c$, on which the arm $d$ is pivoted. The arm is hollow at its pivot end and is provided with a boss $d'$, in which is arranged a coil-spring $h$, inclosed in a cylindrical casing $g$, carried by and abutting against the enlarged end $z$ of the pivot-pin $c$. The cylindrical casing $g$ carries a bearing element $k$, in which is pivoted one end of rocker-arms $l$, whose other ends carry the movable jaw $m$, as shown, and thereby form a parallel motion in which the one member is moved parallel to the other member to and from the hook end $d^2$. The operating-lever $p$ of the pivot-pin $c$ being released, the pin $c$ and casing $g$ are forced by the pressure of the spring $h$ to move the movable jaw $m$ into gripping position. When the faces of the clamping-jaws form wedge-shaped grooves, the rope is securely held during the travel of the carriage along inclines. The means to axially move the pin $c$ consists of a lever $p$, pivoted in the carriage $b$ and whose shorter forked arm engages the end of the pin $c$. The longer arm thereof carries a roller $y$, that contacts against an inclined rail $q$, secured at those points where the carriage is to be released. When a carriage reaches such a rail $q$, the roller $y$ is depressed and brought to the position shown in dotted lines, Fig. 6, and parts of the grip assume the position shown in Fig. 8. If desired, the lever $p$ can be moved by hand, and, if desired, the spring $h$ can be replaced by a weight on the lever.

When the hauling-rope is above the carrier-rope, Fig. 2, the rail $q$ acts on a lever $p^2$, having a rod $p'$, connecting it with a lever $p$, engaging the pivot-pin of the arm $d$.

The sheave $f$ may have various positions, as shown in Figs. 2, 3, and 4, the latter showing the grip applied to a car on a fixed track.

A modification of the gripping mechanism is shown in Figs. 9, 11 and comprises two screws $s$, having bearings in the carriage $b$, said screws having on their inner ends gears $s'$ and rotatable about stub-shafts $n^2$. To these shafts are pivoted the arms $n$ of the movable jaws $n'$, both having a common pivot $o$ in the jaw $d^3$. A rack $r$, engaging both gears, carries a roller $t$, that engages the rail $q$ to raise and depress the rack, and thereby rotate the gears $s'$ and screws $s$ to move the arms $n$ to and from each other, thereby releasing and clamping the rope. The carriage $b$ in this case is similar in form to that shown in Figs. 5 and 6 and has a straight depending piece 10, to which the bucket is secured, and allows this piece 10 to pass between the sheave $f$ and the rope during the passage of the carriage past a sheave without disturbing the drivage. The jaws may both be movable so long as they form an arm movable about a pivot and conform when closed to the shape of the grooves in the supporting-sheaves for the hauling-rope.

Fig. 12 shows a structure similar to Fig. 11, in which there are two levers $n$, pivoted together at $x'$; but in this case the levers carry gripping-jaws $n'$ and $n^3$, that move toward each other in clamping the rope $i$.

When traveling on inclined sections of a ropeway, the wheels on the carrier-rope have a tendency to slip off the carrier-rope, due to the tendency of the loaded carriage to assume a vertical position and also that the hauling-rope is secured in the end of the revoluble arm and apt to be held somewhat to the side of the vertical plane through the carrier-rope. To avoid this, the carriages are provided with counterweights $w$, Figs. 13, 15, substantially equal to the weight of the carriage above the traction-rope $i$ and situated below the point of attachment of the bucket to the carriage. In Fig. 13 a carrier for the wheels $x$ is pivoted at $z$ to the carriage and the bucket $u$ hung on a bolt $v$ in an arcuate slot $w'$ of the sector-shaped counterweight $w$. The center of the arc $w'$ coincides with the middle point of the clamping-jaws on the traction-rope, and were it not for the counterweight the wheels $x$ would run in advance of the carriage or lag behind it.

In the forms shown in Figs. 14 and 15 the bucket is hung at the center of the arm connecting the counterweight $w$ with the carriage and the wheels $x$ journaled directly on the carriage $b$. In this case if it were not for the counterweight the wheels $x$ would be unequally loaded, tending to lift one of the wheels, and consequently cause derailment. In Figs. 13 and 14 the counterweight $w$ is formed as a guide for the bucket-bail, while in Fig. 15 the counterweight is adjustable along the arm connecting it to the carriage.

It will be seen that in all the structures shown the grip takes the form of a pivoted arm and that the grip-operating devices are actuated at the center of movement of the arm and the outer form or end of the arm substantially fits the sheave-grooves, so that the least possible displacement of the traction-rope is necessary in passing them. Furthermore, the pivoted arrangement of the grip permits it to be swung at any angle, and the carriage in most cases being held away from the sheave is permitted to make the smallest possible turn whether in a horizontal curve or any other.

Having thus described our invention, what we claim as new therein, and desire to secure by Letters Patent, is—

1. The combination with a carriage and an axially-movable pivot mounted thereon; of a cable-grip comprising gripping-jaws revoluble on said pivot and means actuated by the axial movements of the pivot to actuate the jaws.

2. In a ropeway-carriage, a traction-rope grip pivoted to the carriage, an axially-movable pivot to actuate the jaws of the grip and means to automatically move the pivot and hold it in its moved position, substantially as described.

3. In a ropeway-carriage, a traction-rope grip having a jaw hooked at its end, one or more coöperating jaws, an axis around which the jaws are movable, and axially-movable means to clamp the jaws, substantially as described.

4. In a ropeway-carriage having carrier-rope wheels, a swinging grip below them to engage the traction-rope and a counterweight below the grip substantially equal to the weight of the carriage above the traction-rope, for the purpose set forth.

5. A grip for ropeways comprising pivoted jaws to engage the rope, said jaws movable about a divided axis on the ropeway-carriage and means to axially move each part of the divided axis to and from each other, substantially as described.

6. A grip for ropeways comprising jaws pivoted together to engage the traction-rope, said jaws revoluble about an axis on the rope-carriage, oppositely-directed screws supporting the axis, a gear-wheel on each screw and a suitably-operated rack-bar to actuate the gear-wheels, whereby the portions of the axis may be moved to and from each other in alinement to open and close the jaws, substantially as described.

In testimony that we claim the foregoing as our invention we have signed our names in presence of the subscribing witnesses.

WILHELM ELLINGEN.
FRITZ DOEHLE.

Witnesses for Wilhelm Ellingen:
GUSTAV ELSNER,
WILHELM KUPPERS.

Witnesses for Fritz Doehle:
L. H. MUNIER,
FÉLICIEN VULLIE SERNEK.